Nov. 3, 1959 W. R. HAYTER, JR 2,911,602
ULTRA-HIGH FREQUENCY CAVITY RESONATOR
Filed Aug. 1, 1955
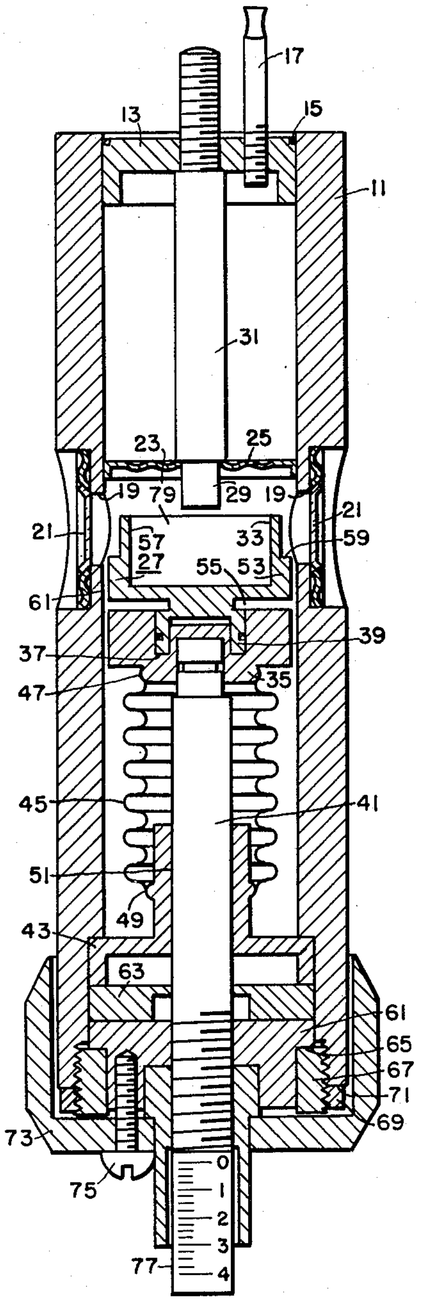
WITNESSES
Leon M. Garman
H O Blair
INVENTOR
Walter R. Hayter, Jr.
BY F. E. Browder
ATTORNEY 2,911,602
Patented Nov. 3, 1959

1

2,911,602

ULTRA-HIGH FREQUENCY CAVITY RESONATOR

Walter R. Hayter, Jr., Elmira, N.Y., assignor to Westinghouse Electric Corporation, East Pittsburgh, Pa., a corporation of Pennsylvania Application August 1, 1955, Serial No. 525,596
1 Claim. (Cl. 333—83)

This invention relates to tunable ultra-high frequency electrical energy devices and more particularly to a tuning apparatus suitable for use in such electrical energy devices, said devices being constructed with a cavity resonator therein.

It is an object of this invention to provide an improved tuning apparatus suitable for use in a cavity resonator.

It is another object to provide an improved tuning apparatus suitable for use in a cavity resonator in which all tuner bearing surfaces are outside the evacuated portion of the cavity resonator.

It is a further object to provide an improved tuning apparatus suitable for use in a cavity resonator which tuning apparatus has improved tuner bearing surfaces thus allowing the cavity resonator to have longer life, more exact dimensions and less contamination from particles of matter.

These and other objects of the invention will be apparent from the following description, taken in accordance with the accompanying drawing which forms a part of this application.

The present application relates to United States Patent 2,883,630, issued April 21, 1959, entitled "Ultra-High Frequency Reference Cavity," by Myron S. Wheeler and assigned to the same assignee as this application.

Referring now to the drawing, a longitudinal center section of a tunable cavity resonator is shown. A cylindrical hollow body or housing 11 is made from a suitable conducting material such as copper. The hollow housing 11 is closed at one end by a closure disc or plate 13 which is hermetically sealed to the housing 11 by a solder ring 15. An exhaust tubulation 17 is provided in the plate 13 for evacuating and sealing off the inner volume of the housing 11.

Diametrically opposite window openings 19 are positioned near the middle region of the housing 11. The window openings 19 are closed by windows 21 of glass or other suitable transmissive material hermetically sealed to the housing 11. Wave energy may pass to and from the interior of the housing 11 through the windows 21.

The middle region of the hollow portion of the housing 11 constitutes the resonant cavity 23. A flexible diaphragm 25 of a suitable material such as copper constitutes the upper wall of the resonant cavity 23. The flexible diaphragm 25 is secured at its periphery to the housing 11 and, by virtue of deformation, will effect a change in the volume, inductance and capacitance of the resonant cavity 23 resulting in a change in the resonant frequency of the cavity 23. The change in inductance and capacitance by the flexible diaphragm 25 is augmented by a nose 29 of a strut rod 31 which protrudes or projects through the center of the flexible diaphragm 25 into the cavity 23. The strut rod 31 is positioned coaxially within the housing 11 and is of a material having a different coefficient of thermal expansion from the housing 11. Invar is a suitable material of which the strut rod 31 may be made. The nose 29 which projects into the cavity 23 is coated or plated with a conductive material such as copper. The strut rod 31 extends from the flexible diaphragm 25 to the upper closure plate 13 and is hermetically sealed thereto. In manufacture, the tuning assembly 27 is set at a predetermined position, the flexible diaphragm 25 is deformed and the nose 29 correctly positioned to tune the resonant cavity 23 to the desired

2 frequency by movement of the strut rod 31. After the strut rod 31 is secured to the upper closure plate 13 and sealed thereto a fine adjustment of the resonant frequency of the cavity 23 may be made by deforming the upper closure plate 13.

The strut rod 31 is composed of a different material than the housing 11 so as to provide a desired differential of thermal expansion between the strut 31 and the housing 11. The length of the strut rod 31 is adjusted so that the desired temperature compensation is obtained so as to maintain the frequency of the cavity 23 substantially constant with varying temperatures.

The tuning assembly 27 includes a tuning nose member 33 and a bellows support member 35. The bellows support member 35 has a cylindrical groove 37 on the top surface thereof into which a cylindrical projection 39 on the lower portion of the tuning nose member 33 is placed and secured. The tuning nose member 33 is a cylindrical member having a lower portion 53 having small clearance, but never touching the inner surface of the housing 11 and having a height of approximately one-quarter wavelength. The bottom portion of the body of the tuning nose member 33 is spaced from the top of the bellows support member 35. The distance from the inner surface of the housing 11 to the outer surface of the tuning member 33 at the point of this spacing distance, or slot 55, is substantially equal to one-quarter wavelength. The cylindrical exterior of the tuning nose member 33 has a smaller diameter tubular portion 57 above the portion 53 and of approximately the same height, forming an annular shelf 59. The exact dimension in length, diameter, and thickness of the section 57 is critically determined to keep the temperature compensation constant over the tuning range. There is a small clearance between the larger diameter portion 53 of the tuning nose member 33 and the housing 11 thus forming an annular slot 61 approximately one-quarter wavelength in height. The combined axial depth of the annular slot 61 with the radial depth of the radial slot 55 gives a total of substantially half a wavelength which results in the presence of a low impedance at the level of annular shelf 59, and, consequently, the effect of a short circuit between the shelf 59 and the housing 11. The shelf 59 is essentially the bottom of a resonant cavity 23.

The upper cylindrical portion 57 and a portion of the lower cylindrical portion 53 of the tuning nose member 33 are hollow and form a cup 79. The cup 79 is sufficiently deep that no energy reaches the bottom. It can be seen from the drawing that the upper portion of the upper cylindrical portion 57 is always closer to the strut nose 29 than is the bottom of the cup 79, and, therefore, the capacitance is essentially, and for all practical considerations, only between the upper cylindrical portion 57 of the tuning nose member 33 and the strut nose 29, rather than between the bottom wall of the cup 79 and the strut nose 29. It can be seen from the above description that the resonant cavity 23 consists of two closed end coaxial transmission lines, the upper one of which is the strut nose 29 coaxially within the housing 11, and closed at the upper end by the flexible diaphragm 29. The lower coaxial transmission line is the upper cylindrical portion 57 of the tuning nose member 33 and the surrounding portion of the housing 11 closed at the lower end by the shelf 59. By adjusting the position of the tuning nose member 33 the capacitance between the two transmission lines is varied and thus the resonant cavity 23 is tuned to different frequencies.

The tuning assembly 27 is provided longitudinal movement by means of the tuner rod member 41. The upper end of the tuner rod member 41 is soldered to, or otherwise fixed with respect to bellows support member 35 and is shown in the drawing coaxially embedded in said bellows support member 35 for mechanical strength. The tuner rod member 41 is positioned coaxially with the housing 11 and extends downward through the bottom plate 63 and protrudes from the lower end of the housing 11. The lower end of the tuner rod 41 is threaded to a nut 61 which is rotatably mounted in the lower end of housing 11 and set against the underface of the lower closure plate 63, all of which members are constructed of materials having thermal expansion coefficients essentially equal to that of the housing 11. The nut 61 has a peripheral downward facing shoulder 65 retained by a ring 67 having threaded engagement with the interior end margin of the housing 11 and fixed in proper position by a locking ring 69. The locking ring 69 is screwed onto the retaining ring 67 so that the upper surface 71 is against the edge of the housing 11.

Adjustable rotation is provided for the nut 61 by a barrel 73 which overlaps the lower margin of the housing 11 and underlies and is fastened to, the nut 61 by means of screws 75. The outer periphery of the barrel 73 may be knurled if desired to render easy operation by the operator. The lower end of the tuner rod member 41 is arranged to protrude from the bottom of the nut 61 and is provided with a scale 77 on a smoothed terminal portion of the tuner rod member 41 so that the operator may conveniently note the adjusted relation of the rod 41 in the nut 61 and the housing 11.

The tuner rod bearing member 43 has a portion of the outer surface attached to the inner surface of the housing member 11 with a portion of the inner surface of the bearing member 43 being in sliding contact with the tuner rod member 41. A flexible vacuum bellows member 45 is attached at one end to a bellows support member peripheral bead member 47. The other end of the bellows member 45 is attached to a tuner rod bearing peripheral bead member 49 on a portion of the outer surface of the tuner rod bearing member 43 thus forming a hermetic seal so that the bearing surface 51 between the tuner rod bearing member 43 and the tuner rod member 41 is outside the evacuated portion of the tunable cavity resonator. In prior art cavity resonators the inner surface of the housing 11 has frequently been used as a bearing surface. As the housing 11 is frequently made of copper, a comparatively soft metal, it has been difficult to properly machine the inner surface of the housing 11 to make a satisfactory surface and to keep the cross section of the housing 11 circular during the necessary heating operations during manufacture of the cavity resonator.

As the material with which the bearing surface makes contact has frequently been a comparatively hard metal such as stainless steel, there has been a tendency for the soft bearing surface to be dug into and become scored and galled. Because of this scoring, metal particles have contaminated portions of the resonant cavity thus reducing its breakdown power rating. Also, the copper surface frequently became scored in such a manner that the tuning assembly became stuck or frozen, thus limiting the usefulness of the cavity resonator.

Also, because the bearing surfaces have been within the evacuated portion of the cavity resonator, it has been extremely difficult to lubricate the surfaces except with such solid lubricants as molybdenum sulfide. Even these lubricants must only be used in minute quantities because, as mentioned above, any loose powder in the resonant cavity will reduce its power breakdown rating.

However, in my invention the bearing surfaces have been positioned outside the evacuated portion of the resonant cavity and are such configurations that standard long-wearing bearing materials may be used for the tuner rod bearing member 43 and for the tuner rod member 41. It is preferred that the tuner rod bearing member 43 and the tuner rod member 41 be constructed of different materials. A suitable material for the tuner rod bearing member 43 is a copper alloy containing 1% nickel, 0.2% phosphorous, 0.5% tellurium, with the remainder being copper. A suitable material for the tuner rod member 41 is stainless steel of the type known as A.I.S.I. 304 (an austenitic stainless steel including not over 0.08% carbon, 18.0 to 20.0% chromium, 8.0 to 11.0% nickel and not over 2.0% manganese).

To increase the bearing life still further, a suitable lubricant may be used. As these lubricants should be capable of performing at temperatures down to −55° C., suitable lubricants include organosiloxane fluids such as dimethylsilicones, with a general chemical formula:

$$CH_3-\underset{CH_3}{\overset{CH_3}{Si}}-O\left[-\underset{CH_3}{\overset{CH_3}{Si}}-O-\right]_n\underset{CH_3}{\overset{CH_3}{Si}}-CH_3$$

These dimethylsilicones may also be mixed with graphite for use as a lubricant.

Temperature compensation is aided by making the tuner rod member 41 of a material whose coefficient of thermal expansion is similar to that of the material of which the housing 11 is made. However, if it is desired to make the tuner rod member 41 of a material with good bearing qualities, but with a different coefficient of thermal expansion from that of the housing 11, temperature compensation may be maintained by suitably changing the length of the strut rod 31.

While the present invention has been shown in one form only, it will be obvious to those skilled in the art that it is not so limited, but is susceptible of various changes and modifications without departing from the spirit and scope thereof.

I claim as my invention:

An ultra-high frequency cavity resonator comprising a hollow housing member made of a conducting material, said hollow housing member having diametrically opposite windows in the side thereof, a flexible conductive diaphragm attached to said hollow housing member above said windows, a temperature compensating strut rod having one end in engagement with said flexible diaphragm for moving and holding same, the other end of said temperature compensating strut rod being connected to a plate closure member which is hermetically sealed to said hollow housing member near the top thereof, said hollow housing member having an evacuated portion, and a tuning assembly for electrically tuning said cavity resonator, said tuning assembly including a tuner rod member, a tuning nose member, a tuner rod bearing member having inner and outer surfaces, a bearing surface between said tuner rod member and said tuner rod bearing member, a flexible vacuum bellows member and a bellows support member, said tuning nose member being operably connected to said tuner rod member, said tuner rod bearing member being of an annular configuration, a portion of the outer surface of said tuner rod bearing member being joined to a portion of the inner surface of said hollow housing member, one end of said flexible vacuum bellows member being attached to a portion of the outer surface of said tuner rod bearing member, the other end of said flexible vacuum bellows member being attached to said bellows support member so that said bearing surface is positioned outside the evacuated portion of the said tunable cavity resonator.

References Cited in the file of this patent

UNITED STATES PATENTS

| | | |
|---|---|---|
| 2,389,271 | Mouromtseff et al. | Nov. 20, 1945 |
| 2,584,717 | Alpert et al. | Feb. 5, 1952 |
| 2,666,904 | Johnson | Jan. 19, 1954 |
| 2,752,576 | Hilliard | June 26, 1956 |
| 2,790,151 | Riblet | Apr. 23, 1957 |